Patented Dec. 8, 1931

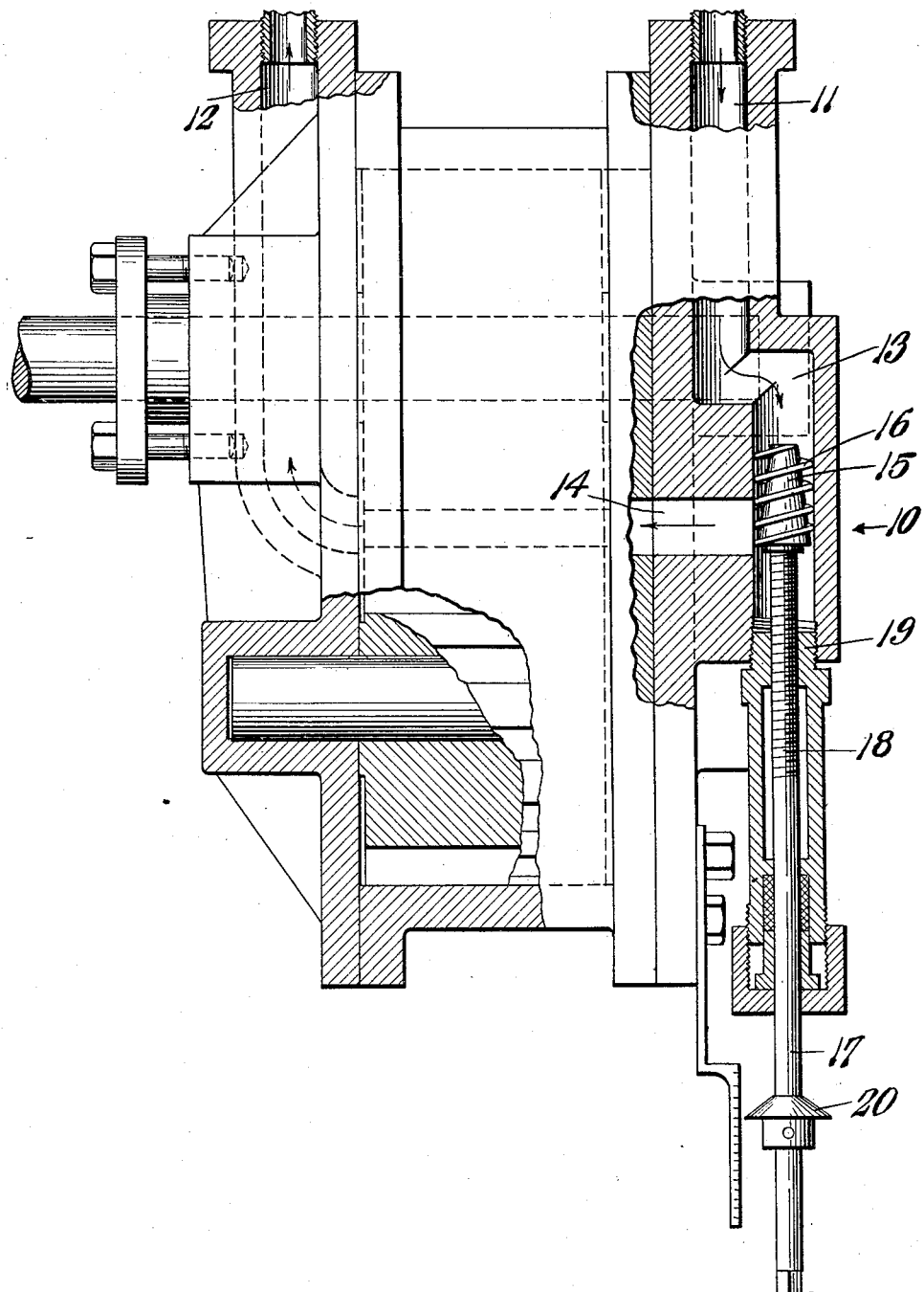

1,835,790

UNITED STATES PATENT OFFICE

CHARLES LEGRAND, OF DOUGLAS, ARIZONA, ASSIGNOR TO PHELPS DODGE CORPORATION, OF NEW YORK, N. Y.

FEED CONTROL FOR FURNACES

Application filed December 2, 1927. Serial No. 237,186.

This invention relates to a fluid control valve adapted particularly to control the flow of a fluid to a fluid motor.

A particular object of the invention is to provide a valve capable of providing a regulatable resistance to limit the maximum flow of fluid to the motor thereby controlling the maximum speed of the motor.

While a preferred form of the invention is disclosed herewith for purposes of illustration, it should be understood that various changes and modifications can be made in the structure without departing from the spirit and scope of the invention as hereinafter described and claimed.

Referring to the drawings more particularly, the reference numeral 10 indicates in general the regulating valve, the inlet to the valve being shown at 11, and the outlet from the valve to the fluid motor being shown at 12.

The valve body is formed with a cylindrical bore 13 in which the valve member operates, and an outlet bore 14 runs at right angles to the bore 13 and connects with the outlet 12. The valve member comprises a conical part 15 which carries a helical flange 16, the outer periphery of the flange 16 being shaped to fit closely in the bore 13.

Suitable mechanism is provided to regulate the position of the valve member in relation to the outlet port 14. In the form illustrated, this regulating means takes the form of screw thread 18 formed on the stem 17 of the valve member and cooperating with similar threads formed in the plug 19. Any suitable means, such as 20, is used to indicate the position of the valve.

The special formation of the valve 15 provides a constricted channel through which the fluid flows, and the position of the valve with relation to the port 14 determines the cross-sectional size of the channel through which the fluid must flow in reaching the outlet port.

By changing the position of the valve member, it is possible to change the size of the channel through which fluid flows to the hydraulic or other fluid motor, thereby controlling the maximum rate at which the fluid motor can operate.

What is claimed is:

1. A controlling device for fluid flow comprising a valve, an elongated valve chamber included in a passage leading from a source of fluid under pressure to a conduit into which the fluid is delivered, a port leading from the side of the valve chamber into said conduit, said valve having a conical formation and provided with a helical flange about said conical formation, and means for positively adjusting the position of the valve transverse to the port opening whereby to vary the volume of fluid passing through the port.

2. In a controlling device for fluid flow, the combination with a valve, of an elongated cylindrical valve chamber intermediate a source of fluid pressure and a conduit into which the fluid is delivered, a port leading from the side of said valve chamber into said conduit, said valve comprising a conical body portion and a helical flange formed on said conical body portion in engagement with the wall of said cylindrical valve chamber to provide a spiral path for said fluid from said chamber into said port, and means for positively adjusting the position of said valve transverse to the port to vary the volume of fluid passing through said port.

3. A fluid controlling device comprising a valve chamber provided with a port leading therefrom and a valve positioned in said chamber adjacent said port, said valve being provided with a conical body portion and a helical flange around said conical body portion.

4. In a controlling device for fluid flow, the combination with a valve, of an elongated cylindrical valve chamber intermediate a source of fluid pressure and a conduit into which the fluid is delievered, a port leading from the side of said valve chamber into said conduit, said valve comprising a conical body portion and a helical flange formed on said conical body portion in engagement with the wall of said cylindrical valve chamber to provide a spiral path for said fluid from said chamber into said port, and means for positively adjusting the position of said valve transverse to the port to vary the volume of fluid passing through said port, said means comprising a threaded rod secured directly to said conical body portion, a calibrated member adjacent thereto, and an indicating member carried by said rod for cooperating with said calibrated member.

In testimony whereof I affix my signature.

CHARLES LEGRAND.